United States Patent
Kümper

(10) Patent No.: US 7,108,254 B2
(45) Date of Patent: Sep. 19, 2006

(54) RUBBER MOUNT FOR SUPPORTING A PROFILE ROD

(75) Inventor: Bernd Kümper, Rahden (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/991,357

(22) Filed: Nov. 17, 2004

(65) Prior Publication Data

US 2005/0280194 A1  Dec. 22, 2005

(30) Foreign Application Priority Data

Nov. 20, 2003  (DE) ................ 103 54 386

(51) Int. Cl.
*F16F 1/38* (2006.01)
(52) U.S. Cl. ....................... 267/276; 267/279
(58) Field of Classification Search ..... 267/140–141.7, 267/276–282; 248/74.1–74.4
See application file for complete search history.

(56) References Cited

U.S. PATENT DOCUMENTS

| | | | | | |
|---|---|---|---|---|---|
| 2,279,865 | A | * | 4/1942 | Ellinwood | 174/40 CC |
| 3,606,218 | A | * | 9/1971 | Eulund et al. | 248/74.2 |
| 5,013,166 | A | * | 5/1991 | Domer | 384/220 |
| 5,330,163 | A | * | 7/1994 | Bodin et al. | 267/140.13 |
| 6,446,947 | B1 | * | 9/2002 | Sauvat et al. | 267/140.12 |
| 6,550,752 | B1 | * | 4/2003 | Nicholson et al. | 267/140.13 |

FOREIGN PATENT DOCUMENTS

| | | |
|---|---|---|
| DE | 3903350 C1 | 8/1990 |
| DE | 69000203 T2 | 12/1992 |
| DE | EP 1065078 A1 | 3/2001 |
| DE | 10144047 A1 | 3/2003 |

* cited by examiner

*Primary Examiner*—Chris Schwartz
(74) *Attorney, Agent, or Firm*—Norris McLaughlin & Marcus PA; Christa Hildebrand

(57) ABSTRACT

The invention is directed to a rubber mount for supporting a profile rod, and more particularly to a rubber mount for supporting a stabilizer of an automobile. It is the object of the invention to provide a mount of the aforedescribed type that can be installed on the profile rod easily, with only a few operating steps, preferably already at the manufacturer's site, and that has an simple and cost-effective construction. The proposed rubber mount includes an elastomer mounting body with an axially continuous slot which enables the mounting body to be pushed radially onto the profile rod for installation thereon. After installation, the mounting body can be secured with a clamping means (bracket), which according to the invention is formed on the mounting body itself. Stated differently, the bracket and mounting body are formed as a single piece, and the bracket is an integral component of the elastomer mounting body.

12 Claims, 4 Drawing Sheets

RUBBER MOUNT FOR SUPPORTING A PROFILE ROD

BACKGROUND OF THE INVENTION

1) Field of the Invention

Figure 1:
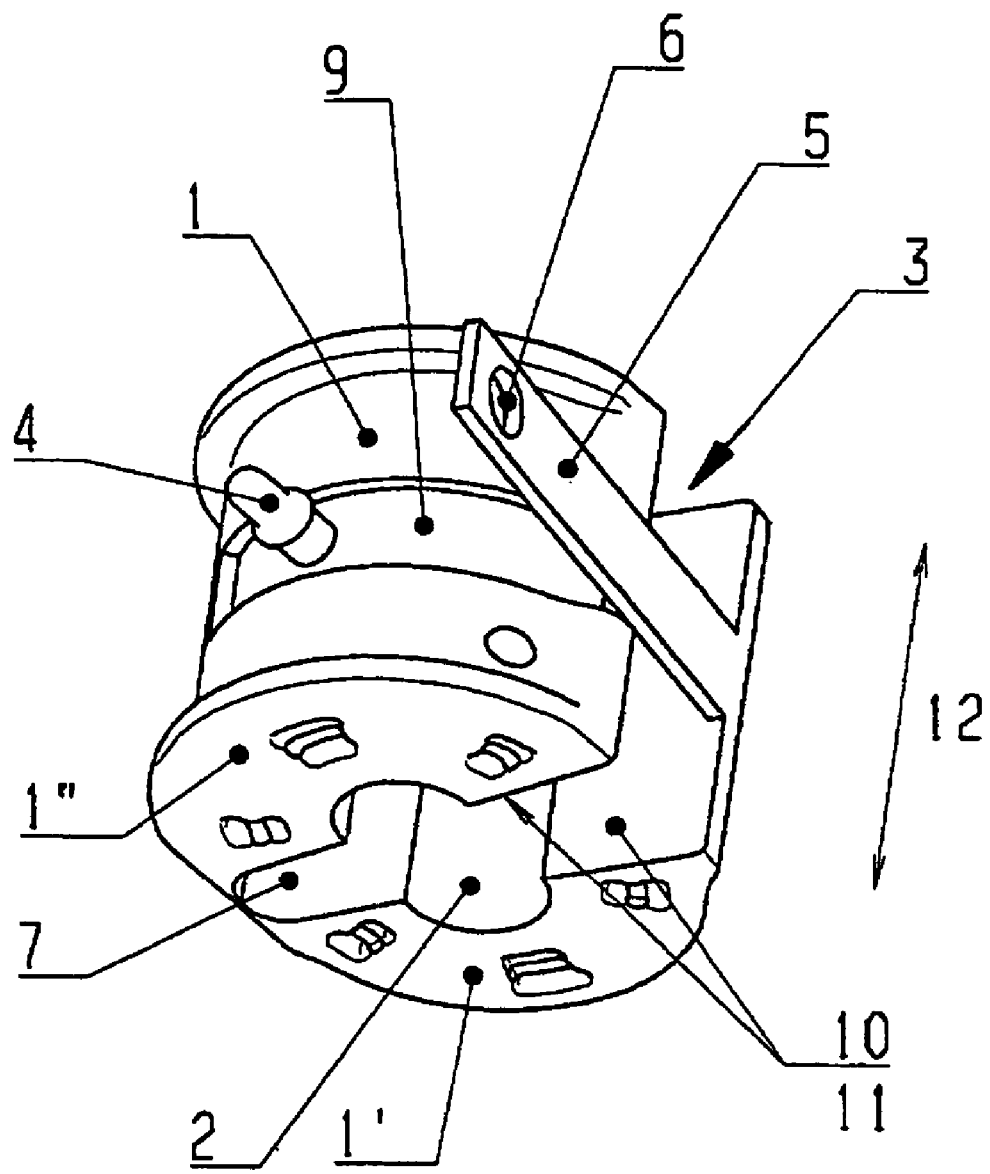

The invention relates to a rubber mount for supporting a profile rod, and more particularly to a rubber mount for supporting a stabilizer for an automobile. However, the mount is not limited to this application.

2) Description of the Related Art

Rubber mounts are used for elastic support of profile rods in various applications. For example, the stabilizers of automobiles are customarily supported by suitable rubber mounts. The stabilizer is hereby received in an essentially cylindrical hollow space of an elastomer mounting body that is open in the axial direction on both ends. The stabilizer with the mounting body is then attached to other components, for example an auxiliary frame of the vehicle, with a clamping element (bracket) that encompasses the mounting body.

In practical applications, the stabilizers are either supplied with preinstalled mounts that are vulcanized on the stabilizer, or the mounts are installed directly at the customer site when the stabilizer is attached to the other components. The first approach entails high production costs for the supplier of the stabilizers, because the mounts can be difficult to install on the stabilizer, frequently requiring several operating steps. The mount is installed by initially pushing the bracket onto the stabilizer from the axial end. The same process is then performed with the rubber element of the mount, which is pushed onto the stabilizer to a position where the profile rod is to be supported. The axial stabilizer geometry can be relatively complex, so that moving the rubber in the axial direction can be difficult at least in certain sections. After the elastomer, i.e., the actual mounting body, is moved to the desired position, the bracket is pushed over the mounting body for securing the rubber element. Care has to be taken not to move the mounting body axially from the intended position.

During preinstallation, i.e., before the stabilizers are actually installed, a clamp that is open on one side is placed around the rubber element disposed on the stabilizer. The stabilizer with the rubber mount in place can be attached with screws, for example to an auxiliary frame, which secures the mount to the stabilizer and simultaneously produces the required pretension in the elastomer. This variant is not user-friendly, because the elastomer mounting body may be difficult to move, as described above.

An improved embodiment of a stabilizer mount is disclosed in DE 39 03 350 C1, where the elastomer mounting body has a slot extending in the axial direction and an opposing slit, also extending in the axial direction. A rubber film hinge is formed in the region of the slit, so that the mounting body can be swung open and placed around the stabilizer. When rotated into a suitable position, the mounting body can initially remain on the stabilizer, without falling off, due to the restoring force of the rubber film hinge. The mounting body is subsequently attached to the stabilizer by two metal half shells and the elastomer is pretensioned, when the stabilizer and the mount are connected to other components.

In another known mount, an elastomer mounting body with an axial slot forms a single unit with a metal clamp that also has an axial slot and closure straps. This unit can be pushed radially onto the profile rod, while the slot is open, for installation thereon and subsequently clamped on the rod. When the mount is installed on the stabilizer, the metal clamp is closed with the straps, closing the slot, i.e., reducing the opening angle of the slot, and compressing the mounting body so as to pretension the elastomer. However, a considerable force or a suitable tool is still required to radially press the mounting body onto the profile rod.

BRIEF SUMMARY OR THE INVENTION

It is an object of the invention to provide a rubber mount for supporting a profile rod, such as an automobile stabilizer, whereby the mount has a simple and cost-effective design and can be easily installed on the profile rod already at the manufacturer's site with only a few installation steps.

The object is solved by a rubber mount having the characterizing features recited in the independent claim. Additional embodiments and improvements of the invention are recited in the dependent claims.

The proposed rubber mount includes, in a manner known in the art, an elastomer mounting body with an essentially cylindrical hollow space that is open at axial ends for receiving the profile rod to be supported. The mounting body also includes at least one axially continuous slot which at least enables installation of the mounting body on the profile rod by pushing the mounting body onto the profile rod in the radial direction. After installation, the mounting body can be secured to profile rod with clamping means (bracket) by reducing the opening angle of the slot formed in the mounting body.

According to an aspect of the invention, the proposed bracket, unlike conventional brackets, is formed on the mounting body itself. Bracket and mounting body are therefore formed as a single piece, i.e., the bracket is an integral component of the elastomer mounting body. Because this type of elastomer mounting body, unlike conventional mounts, is no longer surrounded by a metallic bracket, the slot of the bracket can be easily spread apart for increasing the opening angle when the mount is pushed onto the rod. This significantly facilitates installation.

According to another advantageous feature of the rubber mount according to the invention, the mounting body is formed of two coupled elastomer half shells. The mounting body includes a slit that is located on the side of mounting body radially opposed from the slot. In the radial direction, the slit is not continuous (albeit almost continuous) from the hollow space that receives the profile rod to the outside, but extends in the axial direction along the entire mounting body.

Although the elastomer half shells that form the mounting body are described herein as being coupled with one another, this does not necessarily mean that a hinge is formed, for example, by suitably shaping the elastomer in the region where the half shells are connected with each other. For example, the mount may be swung open just by providing a slit in that region. This arrangement further significantly simplifies installation on the profile rod. It should also be clear from the above description, why the basic shape of the mount according to the invention allows the mount to be pushed onto the rod at least from the radial direction. In the aforementioned embodiment, the mount is no longer pushed on the profile rod, but is simply placed around the rod by swinging open the half shells of the mounting body.

In a particularly useful embodiment of the mount according to the invention, the bracket is formed by a pin, which radially protrudes from the periphery of the mounting body, and a rubber band or rubber strap with an opening. The mount can be secured to the profile rod by bringing the pin that is arranged on one side of the slot into engagement with the opening of the rubber strap that is formed as an extension of the elastomer mounting body on the other side of the slot.

According to an advantageous embodiment of the mount, the opening provided for engagement between the pin and the strap can be formed as a slot and/or and an elongated hole with a diameter that is smaller than the diameter of the pin. Preferably, the pin and the strap are arranged, relative to the axial extent of the mounting body, at approximately the same axial height.

According to another advantageous embodiment of the proposed rubber mount, a recess is formed on the periphery of the mounting body in the region between the slot and the pin. The rubber band or rubber strap can be inserted in the recess, whereby the pin engages with the opening disposed in rubber band or rubber strap when the mount is secured to the profile rod. This arrangement provides a substantially flat outside contour of the mount after installation.

In another advantageous embodiment of the mount according to the invention, the bracket is formed by a snap-in hook receptacle arranged on the periphery of the mounting body and a rubber strap with a snap-in hook. The mount is secured on the profile rod by likewise bringing the snap-in hook receptacle arranged on one side of the slot into engagement with the snap-in hook of the rubber strap that is formed as an extension of the elastomer mounting body on the other side of the slot.

The rubber strap with the snap-in hook and the snap-in hook receptacle, which can be formed as a groove, extend in the axial direction of the rubber mount and essentially along the entire mounting body. When the rubber mount is installed, the outer periphery of the rubber mount has an essentially smooth surface; in particular, the slot is almost completely covered, thereby preventing foreign bodies from entering the slot.

In another advantageous embodiment of the rubber mount according to the invention, the inner surfaces of the slot are profiled. This profile, which can be formed, for example by mutually complementary steps on the opposing inner surfaces of the slot, aids in securing the mounting body, which is clamped with the bracket, on the profile rod.

The rubber mount of the invention can be easily handled during installation on a profile rod, preferably on a stabilizer. Depending on the design of the mount, the mount needs only to be pushed radially onto the stabilizer rod at the desired axial position and placed around the stabilizer rod by swinging open its half shells. The mount is then affixed on the rod with the bracket that advantageously is an integral component of the elastomer mounting body. The manufacturer can therefore preinstall the mounts on the stabilizers before shipping the stabilizers to the customer, thus reducing installation costs and complexity. In addition, as easily seen, the mount has a very simple design. Mounting body and bracket can be produced in a single manufacturing step by designing a suitable injection mold.

BRIEF DESCRIPTION OF THE SEVERAL VIEWS OF THE DRAWING(S)

Figure 2:
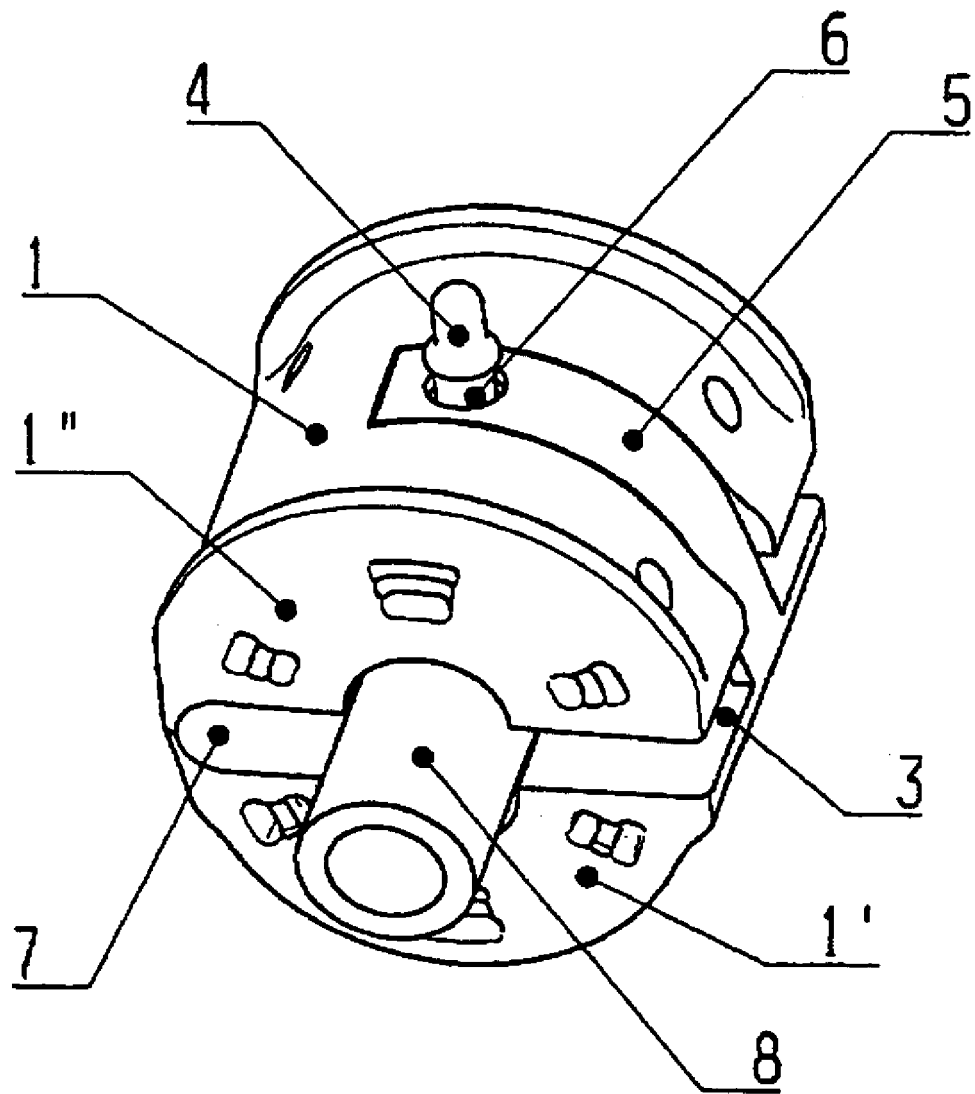
Figure 3:
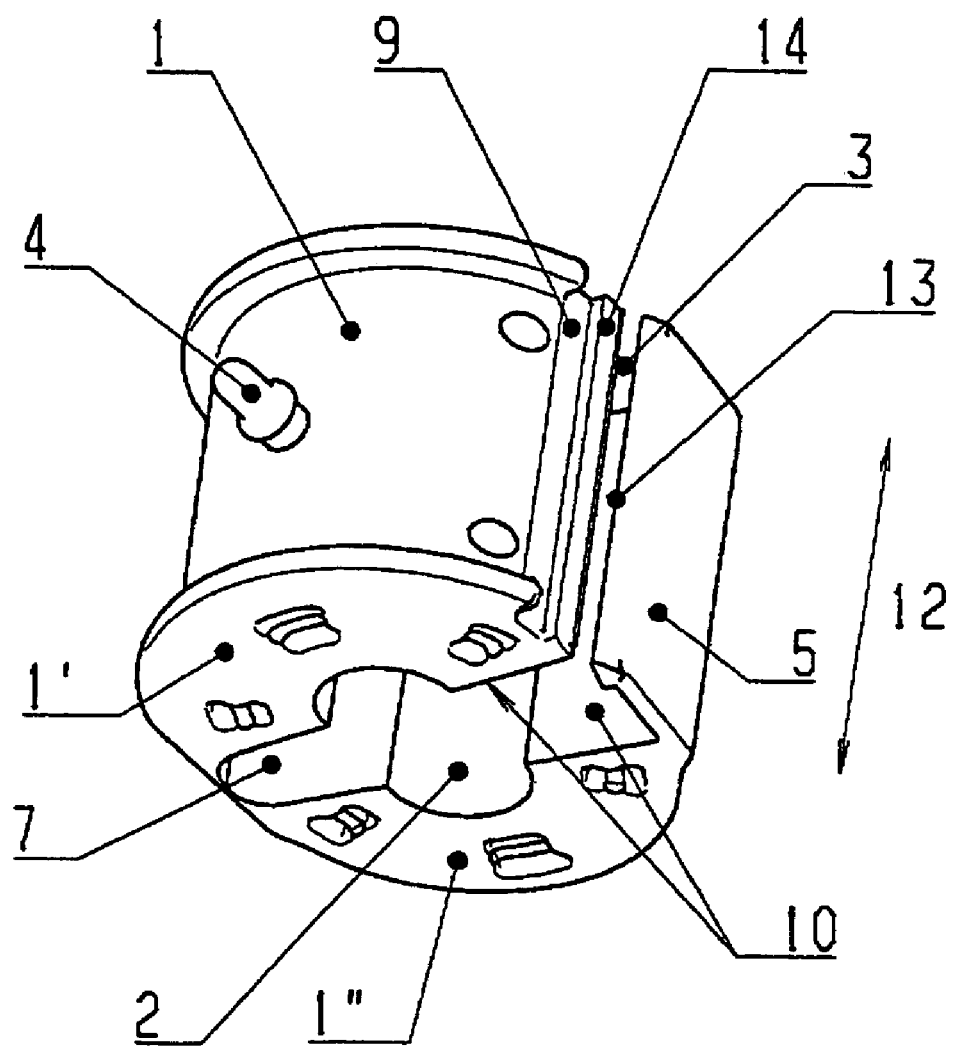
Figure 4:
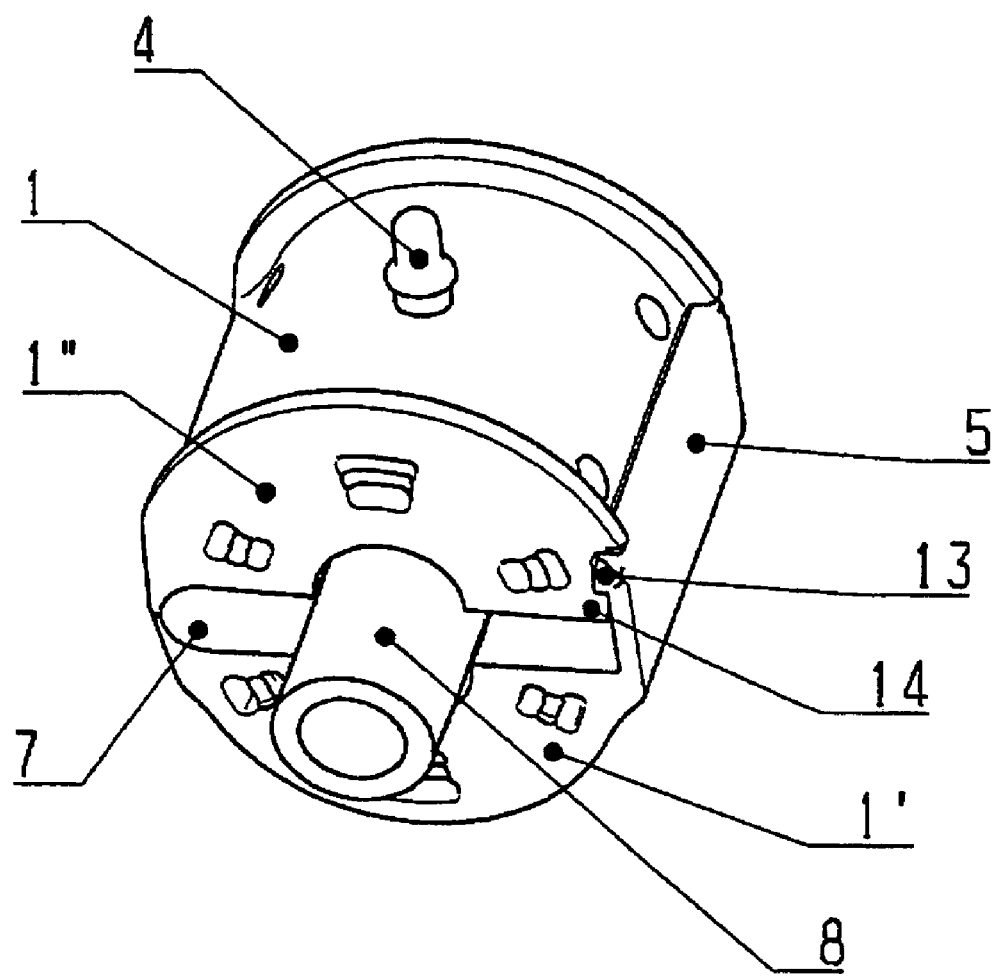

An embodiment of the invention will now be described in more detail. The appended drawings show in:

FIG. 1 the mount of the invention before installation on a profile rod;

FIG. 2 the mount of FIG. 1 after installation and attachment to a profile rod;

FIG. 3 a second embodiment of the mount of the invention before installation on a profile rod; and FIG. 4 the mount of FIG. 3 after installation and attachment to a profile rod.

DETAILED DESCRIPTION OF THE INVENTION

FIG. 1 shows a perspective view of an advantageous embodiment of the mount according to the invention before installation on a profile rod 8 (not shown in FIG. 1). FIG. 1 shows the elastomer mounting body 1 and the bracket 4, 5, 6 formed as an integral component of the mounting body 1. The mounting body 1 includes an essentially cylindrical hollow space 2 that is open in the axial direction 12 (the exact geometry depends, of course, on the geometry of the supported profile rod 8) and an axially continuous slot 3. In the depicted exemplary mount, the mounting body 1 likewise has an axially continuous slit 7 located on the side opposite the slot 3. The slit 7 is not continuous in the radial direction between the hollow space 2 and the outside. Accordingly, the mounting body 1 is composed of two connected half shells 1', 1" and can be easily swung open and placed around the profile rod 8 for subsequent installation on the profile rod 8. A significant feature of the invention is the particular design of the bracket 4, 5, 6 that is used to secure the mounting body 1 after installation on the rod 8 (for example, the stabilizer). According to the invention, the bracket is an integral component of the mounting body 1. In the depicted exemplary embodiment, the bracket 4, 5, 6 is formed by the pin 4 that protrudes radially from the periphery of the mounting body 1, the rubber strap 5 and the opening 6 in the rubber strap 5, whereby the pin 5 engages with the opening 6 for securing the mounting body 1 to the rod 8 after installation. In addition, a recess 9 is provided in the region of the exemplary mounting body 1 between the slot 3 and the pin 4. The strap 5 is inserted in the recess 9 after engagement between the pin 4 and the opening 6, so that the mount has a substantially smooth and flat outside contour. According to the depicted embodiment, the inner surfaces 10 of the slot 3 also include a profiled surface 11, which aids in holding the half shells 1', 1" of the mounting body 1 together after their installation on the rod 8 with the brackets 4, 5, 6.

FIG. 2 shows the rubber mount after installation on the profile rod 8 with the brackets 4, 5, 6. As seen in FIG. 2, the pin 4 engages with the opening 6 for securing the mounting body 1 on the profile rod 8. The mount can optionally be preinstalled on the profile rod 8 by the manufacturer and pretensioned during installation on other components, for example a vehicle frame.

FIGS. 3 and 4 show a second embodiment of the mount of the invention, wherein FIG. 3 shows a perspective view of the rubber mount before installation on a profile rod 8 (not shown in FIG. 3), and FIG. 4 shows the rubber mount after installation on the profile rod 8. In this embodiment, the bracket 5, 13, 14 which herein is also an integral component of the mounting body 1, is formed by a snap-in hook receptacle 14 arranged along the periphery of the mounting body 1, the rubber strap 5 and the snap-in hooks 13 arranged on the rubber strap 5. As seen in FIG. 4, the rubber mount is affixed to the profile rod 8 after installation by engaging the snap-in hook 13 with the snap-in hook receptacle 14. The rubber strap 5, the snap-in hook 13 and the snap-in hook receptacle 14 extend in the axial direction 12 of the rubber mount substantially along the entire mounting body 1. The snap-in hook receptacle 14 can be shaped as a groove. After installation, the outer periphery of the rubber mount has a substantially smooth surface. In particular, the slit 7 it is almost completely covered when the rubber mount is installed. The pin, which is also present in this embodiment, can be used for other functions, for example for affixing or attaching a clamp, a cable support and the like.

| List of reference characters | |
|---|---|
| 1 | mounting body |
| 1', 1" | half shells of the mounting body |
| 2 | hollow space for receiving the profile rod |
| 3 | slot |
| 4 | pin (part of the bracket) |
| 5 | (rubber) strap (part of the bracket) |
| 6 | opening (part of the bracket) |
| 7 | slit |
| 8 | profile rod |
| 9 | recess |
| 10 | inner surfaces of the slot |
| 11 | profiling |
| 12 | axial direction or extent |
| 13 | snap-in hook |
| 14 | snap-in hook receptacle |

The invention claimed is:

1. A rubber mount for supporting a profile rod, comprising an elastomer mounting body with a substantially cylindrical hollow space that is open at axial ends for receiving the profile rod to be supported and at least one axially continuous slot for installation on the profile rod, and clamping means adapted to affix the mount after installation by reducing the opening angle of the slot disposed in the mounting body, whereby the clamping means is formed on the mounting body as one piece as an integral component of the elastomer mounting body, and wherein the clamping means is formed by a pin, which radially protrudes from the periphery of the mounting body, and a rubber strap with an opening, wherein for affixing the mount on the profile rod, the pin that is arranged on one side of the slot can be brought into engagement with the opening of the rubber strap that is formed as an extension of the elastomer mounting body on the other side of the slot.

2. The rubber mount according to claim 1, wherein the pin and the strap are arranged, relative to the axial extent of the mounting body, at approximately the same axial height on the mounting body.

3. The rubber mount according to claim 2, wherein a recess is formed on the periphery of the mounting body in the region between the slot and the pin, with the strap being inserted in the recess after installation of the mount for affixing the mount on the profile rod through engagement between the recess and the pin.

4. The rubber mount according to claim 1, wherein the opening of the rubber strap capable of engaging with the pin is formed as a slot and/or and as an elongated hole and has a diameter that is smaller than the diameter of the pin.

5. The rubber mount according to claim 4, wherein a recess is formed on the periphery of the mounting body in the region between the slot and the pin, with the strap being inserted in the recess after installation of the mount for affixing the mount on the profile rod through engagement between the recess and the pin.

6. The rubber mount according to claim 1, wherein a recess is formed on the periphery of the mounting body in the region between the slot and the pin, with the strap being inserted in the recess after installation of the mount for affixing the mount on the profile rod through engagement between the recess and the pin.

7. The rubber mount according to claim 1, wherein the inner surfaces of the slot comprise a profile that supports attachment of the mount by the mounting means.

8. The rubber mount according to claim 1, wherein the mounting body is made of two coupled elastomer half shells, wherein the mounting body includes a slit that is located on the side of mounting body radially opposite the slot, wherein the slit is radially discontinuous from the hollow space that receives the profile rod to the outside, and wherein the slit extends in the axial direction along the entire mounting body.

9. A rubber mount for supporting a profile rod, comprising an elastomer mounting body with a substantially cylindrical hollow space that is open at axial ends for receiving the profile rod to be supported and at least one axially continuous slot for installation on the profile rod, and clamping means adapted to affix the mount after installation by reducing the opening angle of the slot disposed in the mounting body, whereby the clamping means is formed on the mounting body as one piece with and as an integral component of the elastomer mounting body, and wherein the clamping means is formed by a snap-in hook receptacle arranged on the periphery of the mounting body in the axial direction and a rubber strap with a snap-in hook, wherein for securing the mount on the profile rod, the snap-in hook receptacle arranged on one side of the slot can be brought into engagement with the snap-in hook of the rubber strap that is formed as an extension of the elastomer mounting body on the other side of the slot.

10. The rubber mount according to claim 9, wherein the rubber strap is formed essentially across the axial extent of the elastomer mounting body.

11. The rubber mount according to claim 10, wherein the snap-in hook receptacle is formed substantially across the axial extent of the elastomer mounting body.

12. The rubber mount according to claim 9, wherein the snap-in hook receptacle is formed as a groove extending in the direction of the axial extent.

* * * * *

UNITED STATES PATENT AND TRADEMARK OFFICE
CERTIFICATE OF CORRECTION

PATENT NO. : 7,108,254 B2
APPLICATION NO. : 10/991357
DATED : September 19, 2006
INVENTOR(S) : Kümper It is certified that error appears in the above-identified patent and that said Letters Patent is hereby corrected as shown below:

Column 2, Line 8, "BRIEF SUMMARY OR THE INVENTION" should read -- BRIEF SUMMARY OF THE INVENTION --

Signed and Sealed this

Second Day of January, 2007

JON W. DUDAS
*Director of the United States Patent and Trademark Office*